United States Patent Office 3,285,934
Patented Nov. 15, 1966

3,285,934
2-AZABICYCLO[3.2.0]HEPT-6-EN-3-ONES
Leo A. Paquette, Portage Township, Kalamazoo County, Mich., assignor to The Upjohn Company, Kalamazoo, Mich., a corporation of Delaware
No Drawing. Filed June 11, 1963, Ser. No. 286,963
5 Claims. (Cl. 260—326.5)

This invention relates to novel compositions of matter and to methods for their preparation. In particular, this invention relates to novel 2-azabicyclo[3.2.0]hept-6-en-3-ones of the formula:

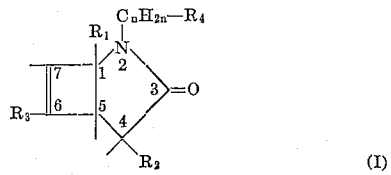

wherein $R_1$ and $R_2$ are alkyl of 1 to 4 carbon atoms, inclusive, wherein $R_3$ is selected from the group consisting of hydrogen and alkyl of 1 to 24 carbon atoms, inclusive, wherein $R_4$ is selected from the group consisting of di-lower-alkylamino and the heterocyclic moieties, aziridinyl, azetidinyl, pyrrolidinyl, piperidino, hexahydroazepinyl, heptamethylenimino, octamethylenimino, morpholino, and thiomorpholino, each of said heterocyclic moieties having attached as substituents on carbon atoms thereof zero to 3 lower alkyls, inclusive, wherein $n$ is 2 to 6, inclusive, wherein N and $R_4$ are separated by a chain of at least 2 carbon atoms, and wherein the nitrogen atom of $R_4$ is attached to a carbon atom of $C_nH_{2n}$. $R_1$ and $R_2$ can be the same or different. When $R_3$ is alkyl, it can be the same as or different than $R_1$ or $R_2$. When $R_4$ is di-lower-alkylamino, the lower alkyls therein can be the same or different. When $R_4$ is a heterocyclic moiety with 2 or more alkyls, the alkyls can be the same or different. When alkyls associated with $R_4$ contain 1 to 4 carbon atoms, inclusive, said alkyls can be the same as or different than $R_1$, $R_2$, and/or $R_3$.

Examples of alkyl of 1 to 4 carbon atoms, inclusive, are methyl, ethyl, propyl, butyl, and isomeric forms thereof. Examples of lower alkyl are methyl, ethyl, propyl, butyl, pentyl, hexyl, heptyl, and octyl, and isomeric forms thereof. Examples of heterocyclic moieties within the scope of $R_4$, in addition to those already mentioned above, are 2-methylaziridinyl,
2-ethylaziridinyl,
2-butylaziridinyl,
2,3-dimethylaziridinyl,
2,2-dimethylaziridinyl,
2-methylazetidinyl,
3-methylazetidinyl,
2-octylazetidinyl,
2,2-dimethylazetidinyl,
3,3-diethylazetidinyl,
2,4,4-trimethylazetidinyl,
2,3,4-trimethylazetidinyl,
2-methylpyrrolidinyl,
3-butylpyrrolidinyl,
2-isohexylpyrrolidinyl,
2,3-dimethylpyrrolidinyl,
2,2-dimethylpyrrolidinyl,
2,5-diethylpyrrolidinyl,
3-tert-butylpyrrolidinyl,
2,3,5-trimethylpyrrolidinyl,
3,4-dioctylpyrrolidinyl,
2-methylpiperidino,
3-methylpiperidino,
4-methylpiperidino,
3-isopropylpiperidino,
4-tert-butylpiperidino,
2-methyl-5-ethylpiperidino,
3,5-dipentylpiperidino,
2,4,6-trimethylpiperidino,
2,6-dimethyl-4-octylpiperidino,
2,3,5-triethylpiperidino,
2-ethylhexahydroazepinyl,
4-tert-butylhexahydroazepinyl,
3-heptylhexahydroazepinyl,
2,4-dimethylhexahydroazepinyl,
3,3-dimethylhexahydroazepinyl,
2,4,6-tripropylhexahydroazepinyl,
2-methylheptamethylenimino,
5-butylheptamethylenimino,
2,4-diisopropylheptamethylenimino,
3,3-diethylheptamethylenimino,
2,5,8-trimethylheptamethylenimino,
3-methyloctamethylenimino,
2,9-diethyloctamethylenimino,
4-isooctyloctamethylenimino,
2-ethylmorpholino,
2-methyl-5-ethylmorpholino,
3,3-dimethylmorpholino,
2,6-di-tert-butylmorpholino,
3-methylthiomorpholino,
2,2-diethylthiomorpholino,
2,6-dihexylthiomorpholino, and the like. In each of the above examples of heterocyclic moieties, the free valence, and hence the point of attachment to a carbon atom of $C_nH_{2n}$ in Formula I, is on the heterocyclic nitrogen atom. Examples of —$C_nH_{2n}$— bridges are —$CH_2CH_2$—,
—$CH_2CH_2CH_2$—,
—$CH_2CH(CH_3)$—,
—$CH_2CH_2CH_2CH_2$—,
—$CH_2CH_2CH(CH_3)$—,
—$CH_2CH(CH_3)CH_2$—,
—$CH_2CH(CH_2CH_3)$—,
—$CH(CH_3)CH(CH_3)$—,
—$CH_2CH_2CH_2CH_2CH_2$—,
—$CH_2CH_2CH_2CH(CH_3)$—,
—$CH_2CH_2CH(CH_3)CH_2$—,
—$CH_2CH(CH_3)CH(CH_3)$—,
—$CH(CH_3)CH_2CH(CH_3)$—,
—$CH_2CH_2CH(CH_2CH_3)$—,
—$CH_2CH(CH_2CH_3)CH_2$—,
—$CH(CH_3)CH(CH_2CH_3)$—,
—$CH_2CH(CH_2CH_2CH_3)$—,
—$CH_2CH_2CH_2CH_2CH_2CH_2$—,
—$CH_2CH_2CH_2CH_2CH(CH_3)$—,
—$CH_2CH_2CH_2CH(CH_3)CH_2$—,
—$CH_2CH_2CH(CH_3)CH_2CH_2$—,
—$CH_2CH_2CH(CH_3)CH(CH_3)$—,
—$CH_2CH(CH_3)CH(CH_3)CH_2$—,
—$CH(CH_3)CH_2CH_2CH(CH_3)$—,
—$CH(CH_2CH_3)CH(CH_2CH_3)$—,
—$CH_2CH(CH_2CH_2CH_3)CH_2$—, and the like. The point of attachment of the nitrogen atom of the 2-azabicyclo[3.2.0]hept-6-en-3-one moiety in compounds of Formula I can be at either end of the above examples of —$C_nH_{2n}$—.

The novel 2-azabicyclo[3.2.0]hept-6-en-3-ones of Formula I exist either in the nonprotonated (free base) form or the protonated form depending upon the pH of the environment. They form stable protonates (acid addition salts) on neutralization with suitable acids, for example, hydrochloric, hydrobromic, sulfuric, phosphoric, nitric, perchloric, thiocyanic, fluosilicic, acetic, benzoic, salicylic, glycolic, succinic, nicotinic, tartaric, maleic, malic, lactic, methanesulfonic, and cyclohexanesulfamic acids, and the like. These acid addition salts are useful in upgrading the free bases. The corresponding free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel compounds of Formula I also form quaternary ammonium salts. For example, they form alkyl quaternary ammonium salts by reaction with an alkyl halide, for example, an alkyl chloride, bromide, or iodide, or by reaction with an alkyl nitrate, an alkali metayl alkyl sulfate, a dialkyl sulfate, an alkyl arylsulfonate, and the like. The anion of the quaternary ammonium salt can be inorganic, for example, chloride, bromide, iodide, nitrate, sulfate, phosphate, and the like, or it can be organic, for example, methosulfate, p-toluenesulfonate, 1-naphthalenesulfonate, acetate, benzoate, salicylate, hydrocinnamate, succinate, lactate, and the like.

The novel 2-azabicyclo[3.2.0]hept-6-ene-3-ones of Formula I, either in the free base form or as acid addition salts, for example, the perchloric acid addition salts, have demonstrated anti-inflammatory activity as shown by the granuloma pouch technique in rats, and are useful in treating inflammatory conditions topically, locally, and systemically in mammals, e.g., cattle, horses, dogs, and cats, and in birds, e.g., poultry. Tests with animals have also shown these compounds to have diuretic and anorexigenic effects, and the compounds are therefore useful for these purposes.

The higher alkyl quaternary ammonium salts of the novel Formula I 2-azabicyclo[3.2.0]hept-6-en-3-ones, for example, wherein the alkyl group is of 9 to 20 carbon atoms, inclusive, exhibit valuable surface-active and cation-active wetting and emulsifying properties, and also exhibit valuable bacteriostatic and bactericidal activity. These higher alkyl quaternary ammonium salts are useful as detergent-sanitizers and can be employed to sanitize equipment used in the processing and preparation of foods, for example, fruit, meat, milk, and the like.

The free base form and the acid addition salt form of compounds of Formula I are useful as intermediates in the preparation of said alkyl quaternary ammonium salts.

The thiocyanic acid addition salts of the 2-azabicyclo[3.2.0]hept-6-en-3-ones of Formula I, when condensed with formaldehyde, form resinous materials useful as pickling inhibitors according to U.S. Patents 2,425,320 and 2,606,155. The compounds of Formula I also form fluosilicic acid addtion salts and alkyl quaternary ammonium fluosilicates which are useful as mothproofing agents according to U.S. Patents 1,915,334 and 2,075,359.

The Formula I compounds of this invention also form salts with penicillins. These salts have solubility characteristics which cause them to be useful in the isolation and purification of penicillins, particularly benzyl penicillin. Said salts can be formed either by neutralization of the free base form of a compound of Formula I with the free acid form of a penicillin, or by a metathetical exchange of the anion of an acid addition salt of a compound of Formula I, for example, the chloride ion of a hydrochloride, with the anionic form of a penicillin.

The novel free bases of Formula I are useful as catalysts for reactions between isocyanates and active hydrogen compounds, e.g., alcohols and amines, and are especially useful as catalysts for the formation of polyurethanes, e.g., polyurethane foams, by interaction of polyisocyanates and polyhydroxy compounds.

The novel 2-azabicyclo[3.2.0]hept-6-en-3-ones of Formula I are also of value as intermediates in chemical synthesis. For example, replacement of the carbonyl oxygen by two hydrogen atoms, for example, by reaction with lithium aluminum hydride, produces the corresponding 2-azabicyclo[3.2.0]hept-6-ene. These diamines form diacid addition salts with thiocyanic acid, fluosilicic acid, and penicillins, which are useful for the same purposes as the monoacid salts of these acids discussed supra, i.e., to prepare pickling inhibitors, as mothproofing agents, and in the isolation and purification of penicillins.

The N-substituted 2-azabicyclo[3.2.0]hept-6-en-3-ones of Formula I are prepared by reacting corresponding 2-azabicyclo[3.2.0]hept-6-en-3-ones of the formula:

(II)

wherein $R_1$, $R_2$, and $R_3$ are as given above, first with an alkali metal reactant selected from the group consisting of alkali metals, alkali metal hydrides, and alkali metal amides. The resulting metallo-organic product is then reacted with a compound of the formula:

$$X—C_nH_{2n}—R_4 \quad (III)$$

wherein X is selected from the group consisting of chloride, bromide, and iodide, wherein $R_4$ and $n$ are as given above, wherein X and $R_4$ are separated by a chain of at least 2 carbon atoms, and wherein the nitrogen atom of $R_4$ is attached to a carbon atom of $C_nH_{2n}$.

2-azabicyclo[3.2.0]hept-6-en-3-ones of Formula II are prepared by exposing Formula IV 1,3-dihydro-2H-azepin-2-ones to ultraviolet radiation according to the equation:

(IV) (II)

In this equation, $R_1$, $R_2$, and $R_3$ are as given above.

1,3-dihydro-2H-azepin-2-ones of Formula IV are either known in the art or can be prepared by the method known in the art, i.e., by interaction of the sodium salt of a di-ortho-substituted phenol with an ethereal solution of chloramide ($ClNH_2$), preferably in the presence of an excess of the phenol [Theilacker et al., Angew. Chem. 72, 131 (1960); ibid., 75, 208–9 (1963)]. Phenols suitable for this reaction are known in the art or can be prepared by methods known in the art [e.g., U.S. Patents 2,831,898; 2,841,622; 2,841,623; and 2,841,624; British Patents 717,588 and 776,204; Kolka et al., J. Org. Chem. 22, 642–6 (1957); Stroh et al., Angew. Chem 69, 699–706 (1957)]. Examples of suitable phenols are
2,6-dimethylphenol (2,6-xylenol),
2,4,6-trimethylphenol (mesitol),
2,6-diethylphenol
2,4,6-triethylphenol,
2,6-dipropylphenol,
2,6-diisobutylphenol,
2,4,6-triisopropylphenol,
2,6-diisobutylphenol,
2,4,6-tri-tert-butylphenol,
2-ethyl-6-methylphenol,
2-methyl-6-propylphenol,
2-ethyl-6-propylphenol,
2-tert-butyl-6-methylphenol,
2-sec-butyl-6-methylphenol,
2-tert-butyl-6-ethylphenol,
2-tert-butyl-6-isopropylphenol,
2-isobutyl-6-propylphenol,
4-sec-butyl-2,6-dimethylphenol,
4-tert-butyl-2,6-dimethylphenol,
2,4-dimethyl-6-ethylphenol,
2,4-dimethyl-6-propylphenol,
6-tert-butyl-2,4-dimethylphenol, 2,6-diethyl-4-methylphenol,
2,6-diisopropyl-4-methylphenol,
2,4-di-tert-butyl-6-methylphenol,
2,6-di-tert-butyl-4-ethylphenol,
2,4-di-tert-butyl-6-propylphenol,
2,6-diisobutyl-4-propylphenol,
2,6-di-tert-butyl-4-sec-butylphenol,
2-tert-butyl-4-ethyl-6-methylphenol,
2-sec-butyl-6-isopropyl-4-methylphenol,
2-butyl-6-tert-butyl-4-methylphenol,
and the like.

With regard to the transformation of a 1,3-dihydro-2H-azepin-2-one of Formula IV to a 2-azabicyclo(3.2.0)hept-6-en-3-one of Formula II, any source of ultraviolet radiation can be used. Compounds within the scope of Formula IV generally absorb ultraviolet radiation strongly in the wave-length range 240 to 260 millimicrons, and it is preferred that the ultraviolet radiation include this range of wave lengths. It is not essential that other wave lengths of radiation be excluded, and therefore, either filtered or unfiltered ultraviolet radiation can be used.

The intensity of ultraviolet radiation is not critical. For example, mercury arcs with quartz envelopes and rated at 100 to 1000 watts, preferably 200 watts, are useful in this process.

It is preferred to carry out the irradiation in the range about 20° to about 40° C., although higher or lower temperatures, for example, about 0° to about 80° C. can be used. It is also preferred to use an inert reaction solvent, with the Formula IV reactant present in the concentration range about 0.1% to about 15% by weight, preferably about 0.5% to about 3% by weight. Solvents useful for this purpose include methanol, ethanol, propanol, isopropyl alcohol, benzene, toluene, hexane, chloroform, carbon tetrachloride, diethyl ether, tetrahydrofuran, and the like. Particularly preferred as solvents are methanol and tetrahydrofuran.

The length of time required for the irradiation is dependent on such factors as the nature of the reactant, the nature of the reaction solvent, the intensity of the radiation, and the temperature. For example, with a 200-watt mercury arc, the reaction requires about 10 to about 100 hours at about 25° C. The course of the reaction can be followed easily by observing the gradual changes in ultraviolet absorption of the reaction mixture, particularly in the region 240 to 260 millimicrons.

For the N-substitution of Formula II 2-azabicyclo[3.2.0]hept-6-en-3-ones, suitable alkali metal reactants are lithium metal, sodium metal, potassium metal, lithium hydride, sodium hydride, potassium hydride, lithium amide, sodium amide, and potassium amide. Sodium metal, sodium hydride, and sodium amide are preferred because they are relatively inexpensive and of particularly suitable reactivity for this purpose. The alkali metal, alkali metal hydride, or alkali metal amide is preferably used in a finely divided form, preferably in admixture with or as a suspension or dispersion in an inert liquid, for example, benzene, toluene, xylene, cumene, mesitylene, tetrahydronaphthalene, hexane, heptane, octane, mineral oil, dioxane, dimethylformmamide, N-methylpyrrolidone, dimethyl sulfoxide, dialkyl ethers of ethylene glycol, dialkyl ethers of diethylene glycol, and mixtures thereof. Particularly preferred is an approximately 50 percent dispersion of micron-range sodium hydride crystals in mineral oil. An inert liquid of the type mentioned above can also with advantage be used as a solvent or diluent for the 2-azabicyclo[3.2.0]hept-6-en-3-one reactant.

The alkali metal reactant and the 2-azabicyclo[3.2.0]hept-6-en-3-one reactant are mixed, and the reaction between them is carried out at temperatures which can vary from about 0° to about 150° C., preferably from about 25° to about 100° C. The most suitable temperature will of course depend upon such factors as the reactivities of the alkali metal reactant and the 2-azabicyclo[3.2.0]hept-6-en-3-one, and the nature of the solvent. For example, relatively high reaction temperatures are usually necessary when using lithium reactants, and lower temperatures are preferred when using the more reactive materials such as potassium reactants. With the sodium reactants, for example, sodium hydride, reaction temperatures ranging from about 25° to about 100° C. are preferred but higher or lower temperatures can be used. It is preferred to react approximately equimolecular amounts of the 2-azabicyclo[3.2.0]hept-6-en-3-one reactant and the alkali metal reactant, although an excess of either reactant can be used. The time required for completing the reaction will depend on the reaction temperature, the reactivities of the two reactants, and the nature of the solvent. Illustratively, with sodium hydride, the reaction usually requires about 15 minutes to about 3 hours at temperatures ranging from about 50° to about 100° C.

After the reaction between the alkali metal reactant and the 2-azabicyclo[3.2.0]hept-6-en-3-one reactant is complete, the metallo-organic reaction product can be isolated from the reaction mixture, for example, by removal of the solvent by evaporation or distillation and can be purified if desired, for example, by washing or digestion with a suitable solvent, for example, additional portions of the reaction solvent. However, where the character of the reaction mixture indicates the absence of a substantial amount of impurities, it is preferred to use the entire reaction mixture containing the metallo-organic reaction product in the next step of the reaction sequence which is a reaction with the organic halide of Formula III.

The organic chlorides are ordinarily preferred for this next step because they are usually more easily prepared and are relatively inexpensive, although the corresponding organic bromides and iodides can be used and are advantageous in some instances because of their greater reactivity. Examples of Formula III chlorides suitable for this reaction are N-(2-chloroethyl)dimethylamine,
N-(2-chloroethyl)-N-methylethylamine,
N-(2-chloroethyl)diethylamine,
N-(2-chloroethyl)dipropylamine,
N-(2-chloroethyl)diisopropylamine,
N-(2-chloroethyl)-N-methylisopropylamine,
N-(2-chloroethyl)dibutylamine,
N-(2-chloroethyl)di-sec-butylamine,
N-(2-chloroethyl)diisobutylamine,
N-(2-chloroethyl)di-tert-butylamine,
N-(2-chloroethyl)-N-methylbutylamine,
N-(2-chloroethyl)-N-ethyl-sec-butylamine,
N-(2-chloroethyl)dipentylamine,
N-(2-chloroethyl)diisopentylamine,
N-(2-chloroethyl)-N-methylpentylamine,
N-(2-chloroethyl)-N-ethyl-2-methylbutylamine,
N-(2-chloroethyl)dihexylamine,
N-(2-chloroethyl)diisohexylamine,
N-(2-chloroethyl)-N-methylhexylamine,
N-(2-chloroethyl)-N-ethyl-2,3-dimethylbutylamine,
N-(3-chloropropyl)dimethylamine,
N-(3-chloropropyl)diethylamine,
N-(3-chloropropyl)-N-methylisobutylamine,
N-(3-chloropropyl)diisopentylamine,
N-(2-chloropropyl)diethylamine,
N-(2-chloropropyl)-N-methylisopropylamine,
N-(4-chlorobutyl)dimethylamine,
N-(4-chlorobutyl)di-tert-butylamine,
N-(3-chlorobutyl)-N-methylethylamine,
N-(3-chloro-1-methylpropyl)dibutylamine,
N-(2-chloro-1-methylpropyl)diethylamine,
N-(5-chloropentyl)dimethylamine,
N-(3-chloro-1,2-dimethylpropyl)dipropylamine,
N-(5-chloro-2-methylpentyl)diethylamine,
N-(6-chlorohexyl)dihexylamine,
N-(4-chloro-1-methylpentyl)-N-methylethylamine,
N-(2-chloroethyl)aziridine,
N-(2-chloroethyl)-2-methylaziridine,
N-(3-chloro-propyl)-2,3-dimethylaziridine, N-(4-chlorobutyl)-2,2-dimethylaziridine,
N-(5-chloro-2-methylpentyl)aziridine,
N-(2-chloroethyl)azetidine,
N-(2-chloroethyl)-2-methylazetidine,
N-(3-chloropropyl)-3-methylazetidine,
N-(2-chloropropyl)-2-octylazetidine,
N-(5-chloropentyl)-2,2-dimethylazetidine,
N-(5-chloro-2-methylpentyl)-3,3-diethylazetidine,
N-(3-chloro-1,2-dimethylpropyl)-2,4,4-trimethylazetidine,
N-(2-chloroethyl)pyrrolidine,
N-(3-chloropropyl)-2-methylpyrrolidine,
N-(2-chloropropyl)-3-butylpyrrolidine,
N-(4-chlorobutyl)-2-isohexylpyrrolidine,
N-(2-chloroethyl)-2,3-dimethylpyrrolidine,
N-(2-chloroethyl)-2,2,4-trimethylpyrrolidine,
N-(3-chloro-1-methylpropyl)-2,2-dimethylpyrrolidine,
N-(6-chlorohexyl)-2,5-diethylpyrrolidine,
N-(3-chlorobutyl)-3-tert-butylpyrrolidine,
N-(5-chloro-2-methylpentyl)-3,4-dioctylpyrrolidine,
N-(3-chloropropyl)piperidine,
N-(2-chloroethyl)-2-methylpiperidine,
N-(2-chloropropyl)-3-methylpiperidine,
N-(3-chlorobutyl)-4-methylpiperidine,
N-(4-chlorobutyl)-3-isopropylpiperidine,
N-(2-chloro-1-methylethyl)-4-tert-butylpiperidine,
N-(2-chloroethyl)-2,4,6-trimethylpiperidine,
N-(3-chloropropyl)-2-methyl-5-ethylpiperidine,
N-(5-chloropentyl)-3,5-dipentylpiperidine,
N-(6-chlorohexyl)-2,6-dimethyl-4-octylpiperidine,
N-(2-chloroethyl)hexahydroazepine,
N-(2-chlorobutyl)-2-ethylhexahydroazepine,
N-(3-chloropropyl-4-tert-butylhexahydroazepine,
N-(3-chloro-1-methylpropyl)-3,3-dimethylhexahydroazepine,
N-(5-chloropentyl)-2,4,6-tripropylhexahydroazepine,
N-(2-chloroethyl)heptamethylenimine,
N-(3-chloropropyl)-2-methylheptamethylenimine,
N-(3-chlorobutyl)-2,4-diisopropylheptamethylenimine,
N-(5-chloro-2-methylpentyl)-3,3-dimethylheptamethylenimine,
N-(4-chlorobutyl)octamethylenimine,
N-(2-chloroethyl)-3-methyloctamethylenimine,
N-(6-chlorohexyl)-4-isooctyloctamethylenimine,
N-(3-chloropropyl)morpholine,
N-(3-chloro-1-methylpropyl)-2-ethylmorpholine,
N-(2-chloroethyl)-2-methyl-5-ethylmorpholine,
N-(4-chloro-1-methylpentyl)-3,3-dimethylmorpholine,
N-(3-chloropropyl)thiomorpholine,
N-(5-chlorohexyl-3-methylthiomorpholine,
N-(2-chloroethyl)-2,2-dipentylthiomorpholine, and the like. Examples of bromides and iodides of Formula III suitable for this reaction are the bromides and iodides corresponding to each of the above Formula III chlorides.

These organic halides of Formula III are either known in the art or can be prepared by methods known in the art [e.g., U.S. Patents 2,483,998; 2,584,131; 2,590,125; and 2,608,574; J. Am. Chem. Soc. 68 1516–23 (1946); J. Am. Chem. Soc. 68, 1556–9 (1946); J. Am. Chem. Soc. 68, 1579–84 (1946); J. Am. Chem. Soc. 68, 2592–2600 (1946); J. Am. Soc. 69, 1258–60 (1947); J. Am. Chem. Soc. 70, 3100–2 (1948); J. Am. Chem. Soc. 71, 3988–90 (1949); J. Am. Chem. Soc. 74, 653–6 (1952); J. Am. Chem. Soc. 75, 2072–4 (1953); J. Am. Chem. Soc. 77, 2855–60 (1955); and Helv. Chim. Acta 37, 472–83 (1954)].

The organic halide is added to the metallo-organic reaction mixture either dropwise or in larger portions. Alternatively, the metallo-organic reaction mixture can be added in a similar manner to the organic halide. In either case, the organic halide can be dissolved in a suitable inert solvent, preferably in one or more of the solvents already present in the metallo-organic reaction mixture or described above as being useful in its preparation. It is particularly advantageous to use a solvent for this purpose when the organic halide is a solid at room temperature. Although only one molecular equivalent of the organic halide is required for reaction with one molecular equivalent of the metallo-organic reaction product (preferably calculated on the basis of the amount of 2-azabicyclo[3.2.0]hept-6-en-3-one of Formula II used to prepare the latter), it is preferred to use an excess of the organic halide, for example, about 1.01 to about 5 or even more molecular equivalents of the halide per molecular equivalent of the metallo-organic reaction product. Particularly preferred is the use of about 1.05 to about 2 molecular equivalents of organic halide per molecular equivalent of metallo-organic reaction product. Suitable reaction times and reaction temperatures for the interaction of organic halide and metallo-organic reaction product depend upon the nature of the reactants and the solvent, and the usual inverse relationship between time and temperature is observed. The organic iodides are the most reactive and the organic chlorides the least reactive. Suitable reaction temperatures range from about 0° to about 200° C., preferably from about 10° to about 75° C. Usually, reaction temperatures ranging from about 25° to about 75° C. and reaction times ranging from about 1 to about 20 hours are satisfactory. Before starting the mixing of the metallo-organic reaction mixture and the organic halide, it is desirable to cool the former, for example, externally with ice, to within a range of about 0° to about 25° C., preferably to within a range of about 5° to about 15° C. After the mixing is complete, the temperature of the reaction mixture is caused to rise to a suitable reaction temperature as discussed above. The desired N-substituted 2-azabicyclo-[3.2.0]hept-6-en-3-one of Formula I can be isolated from the reaction mixture by conventional methods, for example, by removal of reaction solvent by evaporation or distillation. If an alkali metal halide is present as a solid in the reaction mixture, it may with advantage be removed by filtration before the desired organic reaction product is isolated.

The N-substituted 2-azabicyclo[3.2.0]hept-6-en-3-ones of Formula I are transformed to acid addition salts by neutralization with the corresponding inorganic or organic acid, examples of which are given above. This transformation can be carried out by a variety of procedures known to the art to be generally useful for the preparation of amine acid addition salts. The choice of the most suitable procedure will depend on a variety of factors including convenience of operation, economic considerations, and particularly the solubility characteristics of the amine, the acid, and the acid addition salt. If the acid is soluble in water, the basic Formula I compound can be dissolved in water containing at least an equivalent amount of the acid and thereafter the water can be removed by evaporation. If the acid is soluble in a relatively non-polar solvent, for example, diethyl ether or diisopropyl ether, separate solutions of the acid and the basic compound of Formula I in such a solvent can be mixed in equivalent amounts, whereupon the acid addition salt will usually precipitate because of its relatively low solubility in the non-polar solvent. Alternatively, the basic compound of Formula I can be mixed with the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt.

These aspects of the invention can be more fully understood by the following examples.

EXAMPLE 1

*Part A.—1,3-dihydro-3,5,7-trimethyl-2H-azepin-2-one*

Following the procedure of Theilacker et al., supra, the sodium salt of 2,4,6-trimethylphenol was reacted with chloramide in the presence of an excess of this phenol. 1,3-dihydro - 3,5,7 - trimethyl-2H-azepin-2-one was obtained; M.P. 132° C.

*Part B.—1,4,6-trimethyl - 2 - azabicyclo[3.2.0]hept-6-en-3-one*

A solution of 1,3-dihydro-3,5,7-trimethyl-2H-azepin-2-one (5.0 g.; 0.033 mole) in 350 ml. of methanol was exposed to unfiltered ultraviolet radiation from a water-cooled, immersion-type, 200 watt, quartz Hanovia lamp for 22 hours. The temperature of the solution remained at about 20° to 25° C. during this time. The solvent was then removed by distillation and the residual brown oil was adsorbed on a 300-g. column of Florisil (60–100 mesh; a magnesium trisilicate; obtained from the Floridin Company, Tallahassee, Fla. Elution with 4000 ml. of hexane was followed by elution with 2000 ml. of a mixture of acetone and hexane (1:10 by volume). Evaporation of the first eluate gave 1.15 g. of starting material. Evaporation of the second eluate gave 2.1 g. of a white solid which was recrystallized from hexane to give 1,4,6-trimethyl-2-azabicyclo[3.2.0]hept-6-en-3-one; M.P. 72–73° C.

*Analysis.*—Calcd. for $C_9H_{13}NO$: C, 71.49; H, 8.67; N, 9.26. Found: C, 71.25; H, 8.36; N, 9.20.

Following the procedure of Example 1, Part A, but substituting for the 2,4,6-trimethylphenol, 2,6-dimethylphenol;
2,6-diethylphenol;
2,6-dipropylphenol;
2,6-diisopropylphenol;
2,6-diisobutylphenol;
2,6-dibutylphenol;
2,4,6-triethylphenol;
2,6-diethyl-4-methylphenol;
2,6-dimethyl-4-ethylphenol;
4,tertbutyl-2,6,-dimethylphenol;
2,6-diisopropyl-4-methylphenol;
2,6-diisobutyl-4-propylphenol;
4-sec-butyl-2,6-dimethylphenol; and
2,4,6-triisopropylphenol, there are obtained 1,3-dihydro-3,7-dimethyl-2H-azepin-2-one;
1,3-dihydro-3,7-diethyl-2H-azepin-2-one;
1,3-dihydro-3,7-dipropyl-2H-azepin-2-one;
1,3-dihydro-3,7-diisopropyl-2H-azepin-2-one;
1,3-dihydro-3,7-diisobutyl-2H-azepin-2-one;
1,3-dihydro-3,7-dibutyl-2H-azepin-2-one;
1,3-dihydro-3,5,7-triethyl-2H-azepin-2-one;
1,3-dihydro-3,7-diethyl-5-methyl-2H-azepin-2-one;
1,3-dihydro-3,7-dimethyl-5-ethyl-2H-azepin-2-one;
1,3-dihydro-5-tert-butyl-3,7-dimethyl-2H-azepin-2-one;
1,3-dihydro-3,7-diisopropyl-5-methyl-2H-azepin-2-one;
1,3-dihydro-3,7-diisobutyl-5-propyl-2H-azepin-2-one;
1,3-dihydro - 5 - sec-butyl-3,7-dimethyl-2H-azepin-2-one; and
1,3-dihydro-3,5,7-triisopropyl-2H-azepin-2-one, respectively.

Following the procedure of Example 1, Part B, but substituting for the 1,3-dihydro-3,5,7-trimethyl-2H-azepin-2-one, each of the above 1,3-dihydro-2H-azepin-2-ones, in the order listed, there are obtained 1,4-dimethyl-2-azabicyclo[3.2.0]hept-6-en-3-one;
1,4-diethyl-2-azabicyclo[3.2.0]hept-6-en-3-one;
1,4-dipropyl-2-azabicyclo[3.2.0]hept-6-en-3-one;
1,4-diisopropyl-2-azabicyclo[3.2.0]hept-6-en-3-one;
1,4-diisobutyl-2-azabicyclo[3.2.0]hept-6-en-3-one;
1,4-dibutyl-2-azabicyclo[3.2.0]hept-6-en-3-one;
1,4,6-triethyl-2-azabicyclo[3.2.0]hept-6-en-3-one;
1,4-diethyl-6-methyl-2-azabicyclo[3.2.0]hept-6-en-3-one;
1,4-dimethyl-6-ethyl-2-azabicyclo[3.2.0]hept-6-en-3-one;
6-tert-butyl-1,4-dimethyl-2-azabicyclo[3.2.0]hept-6-en-3-one;
1,4-diisopropyl-6-methyl-2-azabicyclo[3.2.0]hept-6-en-3-one;
1,4-diisobutyl-6-propyl-2-azabicyclo[3.2.0]hept-6-en-3-one;
6-sec-butyl-1,4-dimethyl-2-azabicyclo[3.2.0]hept-6-en-3-one; and
1,4,6-triisopropyl-2-azabicyclo[3.2.0]hept-6-en-3-one, respectively.

EXAMPLE 2

*Part A.—2-(2-diethylaminoethyl)-1,4,6-trimethyl-2-azabicyclo[3.2.0]hept-6-en-3-one free base*

A 51.5% sodium hydride suspension in mineral oil (1.55 g.; equivalent to 0.033 mole of sodium hydride) was added to a solution of 1,4,6-trimethyl-2-azabicyclo [3.2.0]hept-6-en-3-one (5.0 g.; 0.033 mole) in 40 ml. of dimethylformamide. The resulting mixture was stirred and warmed to 50° C. during 30 minutes. After cooling to about 10° C., a solution of N-(2-chloroethyl)diethylamine (4.9 g.; 0.036 mole) in 11.4 ml. of xylene was added in one portion. The resulting brown mixture was heated with stirring at 50° C. for one hour. After again cooling to about 10° C., 50 ml. of diethyl ether was added and the resulting precipitate was filtered. The filtrate was evaporated, and the residual oil was distilled to give 6.85 g. of 2-(2-diethylaminoethyl)-1,4,6-trimethyl-2-azabicyclo [3.2.0]hept-6-en-3-one free base in the form of a pale yellow oil, B.P. 101–110° C. at 0.20 mm.; $n_D^{26}$ 1.4806.

*Part B.—2-(2-diethylaminoethyl)-1,4,6-trimethyl-2 - azabicyclo[3.2.0]hept-6-en-3-one perchloric acid addition salt*

Perchloric acid (70% aqueous) containing an equal volume of absolute ethanol was added gradually to a diethyl ether solution of 2-(2-diethylaminoethyl)-1,4,6-trimethyl-2-azabicyclo[3.2.0]hept-6-en-3-one until further addition no longer caused precipitate to form. The solid precipitate was filtered, washed with diethyl ether, and recrystallized from a mixture of ethanol and diethyl ether to give 2-(2-diethylaminoethyl)-1,4,6-trimethyl-2-azabicyclo[3.2.0]hept-6-en-3-one perchloric acid addition salt in the form of a white solid; M.P. 102–104° C.

*Analysis.*—Calcd. for $C_{15}H_{27}ClN_2O_5$: C, 51.35; H, 7.76; N, 7.99. Found: C, 51.19; H, 7.54; N, 7.70.

Following the procedure of Example 2, Part B, but substituting for the perchloric acid, hydrogen chloride; hydrogen bromide; hydrogen iodide; sulfuric acid; phosphoric acid; thiocyanic acid; acetic acid; benzoic acid; salicylic acid; glycolic acid; succinic acid; niotinic acid; tartaric acid; maleic acid; malc acid; lactic acid; methanesulfonic acid; and cyclohexanesulfamic acid, there are obtained the corresponding acid addition salts of 2-(2-diethylaminoethyl)-1,4-6-trimethyl - 2 - azabicyclo[3.2.0] hept-6-en-3-one. Of these the hydrochloride, acetate, and cyclohexanesulfamate were not obtained in crystalline form.

Following the procedure of Example 2, Part A, but substituting for the

N-(2-chloroethyl)diethylamine,
N-(2-bromoethyl)dimethylamine;
N-(2-iodoethyl)diisopropylamine;
N-(2-chloroethyl)-N-ethyl-2-methylbutylamine;
N-(2-chloroethyl)-dipentylamine;
N-(3-bromopropyl)diethylamine;
N-(3-bromopropyl)-N-methylpentylamine;
N-(3-chloropropyl)dibutylamine;
N-(2-iodopropyl)-N-methylisopropylamine;
N-(3-bromobutyl)-N-methylbutylamine;
N-(5-bromopentyl)dimethylamine;
N-(6-chlorohexyl)dihexylamine;
N-(3-iodo-1,2-dimethylpropyl)dibutylamine; and N-(4-chloro-1-methylpentyl)-N-methylethylamine,
there are obtained, as free bases,
2-(2-dimethylaminoethyl)-1,4,6-trimethyl-2-azabicyclo[3.2.0]hept-6-en-3-one;
2-(2-diisopropylaminoethyl)-1,4,6-trimethyl-2-azabicyclo[3.2.0]hept-6-en-3-one;
2-[2-(N-ethyl-2-methylbutylamino)ethyl]-1,4,6-trimethyl-2-azabicyclo[3.2.0]hept-6-en-3-one;
2-(2-dipentylaminoethyl)-1,4,6-trimethyl-2-azabicyclo[3.2.0]hept-6-en-3-one;
2-(3-diethylaminopropyl)-1,4,6-trimethyl-2-azabicyclo[3.2.0]hept-6-en-3-one;
2-[3-(N-methylpentylamino)propyl]-1,4,6-trimethyl-2-azabicyclo[3.2.0]hept-6-en-3-one;
2-(3-dibutylaminopropyl)-1,4,6-trimethyl-2-azabicyclo[3.2.0]hept-6-en-3-one;
2-[1-methyl-2-(N-methylisopropylamino)ethyl]-1,4,6-trimethyl-2-azabicyclo[3.2.0]hept-6-en-3-one;
2-[1-methyl-3-(N-methylbutylamino)propyl]-1,4,6-trimethyl-2-azabicyclo[3.2.0]hept-6-en-3-one;
2-(5-dimethylaminopentyl)-1,4,6-trimethyl-2-azabicyclo[3.2.0]hept-6-en-3-one;
2-(6-dihexylaminohexyl)-1,4,6-trimethyl-2-azabicyclo[3.2.0]hept-6-en-3-one;
2-[2-methyl-3-(dibutylamino)butyl]-1,4,6-trimethyl-2-azabicyclo[3.2.0]hept-6-en-3-one; and
2-[1-methyl-4-(N-methylethylamino)pentyl]-1,4,6-trimethyl-2-azabicyclo[3.2.0]hept-6-en-3-one,
respectively.

Following the procedure of Example 2, Part A, but substituting for the combination of 1,4,6-trimethyl-2-azabicyclo[3.2.0]hept-6-en-3-one and N-(2-chloroethyl)diethylamine as reactants, 1,4-dimethyl-2-azabicyclo[3.2.0]hept-6-en-3-one plus N-(2-bromoethyl)dimethylamine;
1,4-dipropyl-2-azabicyclo[3.2.0]hept-6-en-3-one plus N-(2-iodoethyl)dipropylamine;
1,4-diisobutyl-2-azabicyclo[3.2.0]hept-6-en-3-one plus N-(3-bromopropyl)diisopropylamine;
1,4,6-triethyl-2-azabicyclo[3.2.0]hept-6-en-3-one plus N-(5-bromopentyl)dimethylamine;
1,4-dimethyl-6-ethyl-2-azabicyclo[3.2.0]hept-6-en-3-one plus N-(6-chlorohexyl)dihexylamine; and
1,4-diisopropyl-6-methyl-2-azabicyclo[3.2.0]hept-6-en-3-one plus N-(4-bromo-1-methylpentyl)-N-methylethylamine,
there are obtained, as free bases,
2-(2-dimethylaminoethyl)-1,4-dimethyl-2-azabicyclo[3.2.0]hept-6-en-3-one;
2-(2-dipropylaminoethyl)-1,4-dipropyl-2-azabicyclo[3.2.0]hept-6-en-3-one;
2-(3-diisopropylaminopropyl)-1,4-diisobutyl-2-azabicyclo[3.2.0]hept-6-en-3-one;
2-(5-dimethylaminopentyl)-1,4,6-triethyl-2-azabicyclo[3.2.0]hept-6-en-3-one;
2-(6-dihexylaminohexyl)-1,4-dimethyl-6-ethyl-2-azabicyclo[3.2.0]hept-6-en-3-one ; and
2-[1-methyl-4-(N-methylethylamino)pentyl]-1,4-diisopropyl-6-methyl-2-azabicyclo[3.2.0]hept-6-en-3-one,
respectively.

Following the procedure of Example 2, Part B, but substituting for the 2-(2-diethylaminoethyl)-1,4,6-trimethyl-2-azabicyclo[3.2.0]hept-6-en-3-one, each of the other specific N-substituted 2-azabicyclo[3.2.0]hept-6-en-3-ones mentioned above, there are obtained the corresponding perchloric acid addition salts. Also following the procedure of Example 2, Part B, each of the other specific N-substituted 2-azabicyclo[3.2.0]hept-6-en-3-ones mentioned above is transformed to the corresponding hydrochloric acid; hydrobromic acid; hydriodic acid; sulfuric acid; phosphoric acid; thiocyanic acid; acetic acid; benzoic acid; salicylic acid; glycolic acid; succinic acid; nicotinic acid; tartaric acid; maleic acid; malic acid; lactic acid; methanesulfonic acid; and cyclohexanesulfamic acid addition salts.

EXAMPLE 3

*Part A.—2-[2-(1-pyrrolidinyl)ethyl]-1,4,6 - trimethyl-2-azabicyclo[3.2.0]hept-6-en-3-one free base*

Following the procedure of Example 2, Part A, N-(2-chloroethyl)pyrrolidine was reacted with 1,4,6-trimethyl-2-azabicyclo[3.2.0]hept-6-en-3-one to give 2-[2-(1-pyrrolidinyl)ethyl]-1,4,6-trimethy-2 - azabicyco[3.2.0]hept-6-en-3-one free base.

*Part B.—2-[2-(1-pyrrolidinyl)ethyl]-1,4,6 - trimethyl-2-azabicyclo[3.2.0]hept-6-en-3-one perchloric acid addition salt*

Following the procedure of Example 2, Part B, perchloric acid was reacted with 2-[2-(1-pyrrolidinyl)ethyl]-1,4,6-trimethyl-2-azabicyclo[3.2.0]hept-6-en-3 - one free base to give the corresponding perchloric acid addition salt.

EXAMPLE 4

*Part A.—2-(3-piperidinopropyl)-1,4,6-trimethyl-2 - azabicyclo[3.2.0]hept-6-en-3-one free base*

Following the procedure of Example 2, Part A, N-(3-chloropropyl)piperidine was reacted with 1,4,6-trimethyl-2-azabicyclo[3.2.0]hept-6-en-3-one to give 2-(3-piperidinopropyl)-1,4,6-trimethyl-2-azabicyclo[3.2.0]hept-6 - en-3-one free base.

*Part B.—2-(3-piperidinopropyl)-1,4,6-trimethyl-2 - azabicyclo[3.2.0]hept-6-en-3-one perchloric acid addition salt*

Following the procedure of Example 2, Part B, perchloric acid was reacted with 2-(3-piperidinopropyl)-1,4,6-trimethyl-2-azabicyclo[3.2.0]hept-6-en-3 - one free base to give the corresponding perchloric acid addition salt.

Following the procedure of Example 3, Part A, but substituting for the combination of
1,4,6-trimethyl-2-azabicyclo[3.2.0]hept-6-en-3-one and N-(2-chloroethyl)pyrrolidine,
1,4-dimethyl-2-azabicyclo[3.2.0]hept-6-en-3-one plus N-(2-chloroethyl)-2,2,4-trimethylpyrrolidine;
1,4-diethyl-2-azabicyclo[3.2.0]hept-6-en-3-plus N-(2-chloro-1-methylethyl)pyrrolidine;
1,4-dipropyl-2-azabicyclo[3.2.0]hept-6-en-3-one plus N-(2-chloroethyl)morpholine;
1,4-diisopropyl-2-azabicyclo[3.2.0]hept-6-en-3-one plus N-(2-chloroethyl)hexahydroazepine;
1,4-diisobutyl-2-azabicyclo[3.2.0]hept-6-en-3-one plus N-(2-bromoethyl)aziridine;
1,4-dibutyl-2-azabicyclo[3.2.0]hept-6-en-3-one plus N-(3-iodopropyl)azetidine;
1,4,6-triethyl-2-azabicyclo[3.2.0]hept-6-en-3-one plus N-(5-chloro-2-methylpentyl)-3,4-dioctylpyrrolidine;
1,4-diethyl-6-methyl-2-azabicyclo[3.2.0]hept-6-en-3-one plus N-(3-iodopropyl)-2-methyl-5-ethylpiperidine;
1,4-dimethyl-6-ethyl-2-azabicyclo[3.2.0]hept-6-en-3-one plus N-(2-bromoethyl)heptamethylenimine;
6-tert-butyl-1,4-dimethyl-2-azabicyclo[3.2.0]hept-6-en-3-one plus N-(3-iodopropyl)octamethylenimine;
and 6-sec-butyl-1,4-dimethyl-2-azabicyclo[3.2.0]hept-6-en-3-one plus N-(2-bromopropyl)thiomorpholine,
there are obtained, as free bases,
2-[2-(2,2,4-trimethyl-1-pyrrolidinyl)ethyl]-1,4-dimethyl-2-azabicyclo[3.2.0]hept-6-en-3-one;
2-[2-(1-pyrrolidinyl)propyl]-1,4-diethyl-2-azabicyclo[3.2.0]hept-6-en-3-one;
2-(2-morpholinoethyl)-1,4-dipropyl-2-azabicyclo[3.2.0]hept-6-en-3-one;
2-[2-(1-hexahydroazepinyl)ethyl]-1,4-diisopropyl-2-azabicyclo[3.2.0]hept-6-en-3-one;

2-[2-(1-aziridinyl)ethyl]-1,4-diisobutyl-2-azabicyclo[3.2.0]hept-6-en-3-one;

2-[3-(1-azetidinyl)propyl]-1,4-dibutyl-2-azabicyclo[3.2.0]hept-6-en-3-one;

2-[5-(3,4-dioctyl-1-pyrrolidinyl)-4-methylpentyl]-1,4,6-triethyl-2-azabicyclo[3.2.0]hept-6-en-3-one;

2-[3-(2-methyl-5-ethylpiperidino)-propyl]-1,4-diethyl-6-methyl-2-azabicyclo[3.2.0]hept-6-en-3-one;

2-[2-(1-heptamethylenimino)ethyl]-1,4-dimethyl-6-ethyl-2-azabicyclo[3.2.0]hept-6-en-3-one;

2-[3-(1-octamethylenimino)-propyl]-6-tert-butyl-1,4-dimethyl-2-azabicyclo[3.2.0]hept-6-en-3-one;

and 2-(1-methyl-2-thiomorpholinoethyl)-6-sec-butyl-1,4-dimethyl-2-azabicyclo[3.2.0]hept-6-en-3-one, respectively.

Following the procedure of Example 3, Part B, each of the above specific N-substituted 2-azabicyclo[3.2.0]hept-6-en-3-ones is transformed to the corresponding perchloric acid; hydrochloric acid; hydrobromic acid; hydriodic acid; sulfuric acid; phosphoric acid; thiocyanic acid; acetic acid; benzoic acid; salicylic acid; glycolic acid; succinic acid; nicotinic acid; tartaric acid; maleic acid; malic acid; lactic acid; methanesulfonic acid; and cyclohexanesulfamic acid addition salts.

I claim:

1. A compound selected from the group consisting of the free base form and acid addition salts of a compound of the formula:

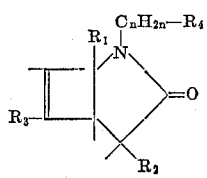

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_4$ is selected from the group consisting of di-lower-alkylamino and the heterocyclic moieties, aziridinyl, azetidinyl, pyrrolidinyl, piperidino, hexahydroazepinyl, heptamethylenimino, octamethylenimino, morpholino, and thiomorpholino, each of said heterocyclic moieties having attached as substituents on carbon atoms thereof zero to 3 lower alkyls, inclusive, wherein $n$ is 2 to 6, inclusive, wherein N and $R_4$ are separated by a chain of at least 2 carbon atoms, and wherein the nitrogen atom of $R_4$ is attached to a carbon atom of $C_nH_{2n}$.

2. 2-(2-diethylaminoethyl)-1,4,6 - trimethyl-2 - azabicyclo[3.2.0]hept-6-en-3-one free base.

3. 2-(2-diethylaminoethyl) - 1,4,6 - trimethyl-2-azabicyclo[3.2.0]hept-6-en-3-one perchloric acid addition salt.

4. A process for producing a 2-azabicyclo[3.2.0]hept-6-en-3-one of the formula:

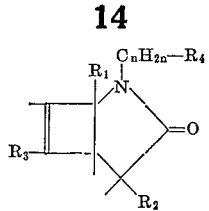

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_4$ is selected from the group consisting of di-lower-alkylamino and the heterocyclic moieties, aziridinyl, azetidinyl, pyrrolidinyl, piperidino, hexahydroazepinyl, heptamethylenimino, octamethylenimino, morpholino, and thiomorpholino, each of said heterocyclic moieties having attached as substituents on carbon atoms thereof zero to 3 lower alkyls, inclusive, wherein $n$ is 2 to 6, inclusive, wherein N and $R_4$ are separated by a chain of at least 2 carbon atoms, and wherein the nitrogen atom of $R_4$ is attached to a carbon atom of $C_nH_{2n}$, which comprises the steps, (1) exposing a compound of the formula:

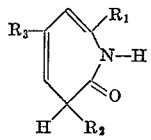

wherein $R_1$, $R_2$, and $R_3$ are as given above, to ultraviolet radiation, (2) mixing the organic product from step (1) with a material selected from the group consisting of alkali metals, alkali metal hydrides, and alkali metal amides, and (3) mixing the metallo-organic reaction product from step (2) with a compound of the formula:

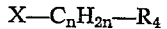

$$X-C_nH_{2n}-R_4$$

wherein X is selected from the group consisting of chloride, bromide, and iodide, wherein $R_4$ and $n$ are as given above, wherein X and $R_4$ are separated by a chain of at least 2 carbon atoms, and wherein the nitrogen atom of $R_4$ is attached to a carbon atom of $C_nH_{2n}$, to form said 2-azabicyclo[3.2.0]hept-6-en-3-one.

5. The process of claim 4 wherein the wave length of said ultraviolet radiation includes the range 240 to 260 millimicrons.

References Cited by the Examiner

Krohs, W., Berichte 88:866–74 (1955).

Mayo et al., Quarterly Reviews, vol. 15, pp. 405–407, (1961).

Stoelzel, Berichte, 74B:982–6 (1941).

Wagner et al., Synthetic Organic Chemistry, (1953) p. 572.

ALEX MAZEL, *Primary Examiner.*

HENRY R. JILES, *Examiner.*

J. A. NARCAVAGE, *Assistant Examiner.*